(No Model.)

J. R. MATHEWSON.
BRACELET.

No. 430,295. Patented June 17, 1890.

WITNESSES.
J. M. Harinett.
L. B. W. Williams

INVENTOR.
James R. Mathewson,
By his Att'y.
Henry W. Williams.

THE NORRIS PETERS CO., PHOTO-LITHO., WASHINGTON, D. C.

UNITED STATES PATENT OFFICE.

JAMES R. MATHEWSON, OF WRENTHAM, MASSACHUSETTS, ASSIGNOR TO WILLIAM H. WADE AND EDWARD P. DAVIS, BOTH OF SAME PLACE.

BRACELET.

SPECIFICATION forming part of Letters Patent No. 430,295, dated June 17, 1890.

Application filed January 16, 1890. Serial No. 337,124. (No model.)

*To all whom it may concern:*

Be it known that I, JAMES R. MATHEWSON, of Wrentham, in the county of Norfolk and State of Massachusetts, have invented a new and useful Improvement in Bracelets, of which the following is a specification.

This invention relates to that class of ornamental bracelets in which the balls or shells constituting the links are perforated and slipped over and upon a spring which supports them and gives shape to the bracelet; and this invention, moreover, relates to bracelets constructed as above described only when such balls or shells constituting the links are substantially round in cross-section, and some of them in each bracelet are provided with ornamentation on their outer surfaces.

Figure 1:
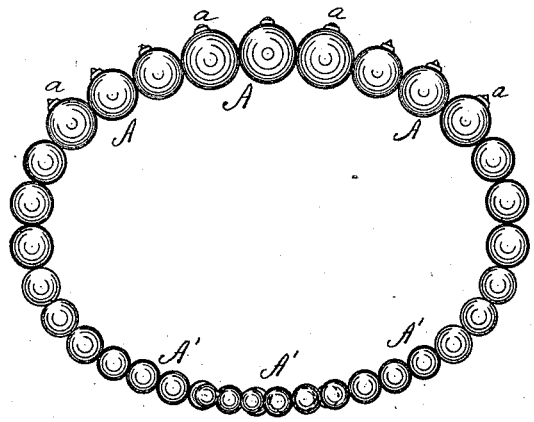
Figure 2:
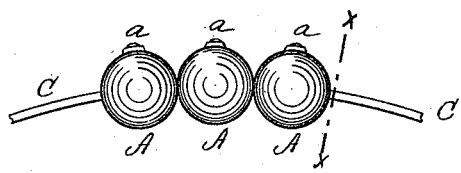
Figure 3:
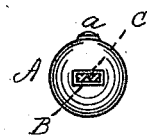
Figure 4:
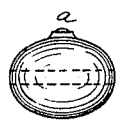
Figure 5:
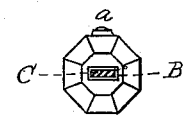

In the accompanying drawings, in which similar letters of reference indicate like parts, Figure 1 is a view of a bracelet constructed in accordance with my improvement. Fig. 2 is an enlarged view of three of the balls forming the links on the spring, shown in edge view. Fig. 3 is a section on line $x$, Fig. 2, with the ball in end elevation. Fig. 4 is an elevation, and Fig. 5 a section showing modifications.

In this bracelet the balls A' are next the inner side of the wrist, and the balls A are to be worn on the outer or upper side of the wrist; hence these balls A, being more prominently in view, are provided with some kind of ornamentation, as $a$. Now as these balls are substantially round in cross-section, if they were strung upon a round wire or upon a flat wire and the perforations in the balls were round they could turn and the ornamentation would be likely to be next the wrist in one ball, in another position in another ball, &c., and the entire effect lost. In order, therefore, to keep the balls A in their proper relative positions and the ornamentation in plain sight, each ball is provided with rectangular perforations or holes B, by means of which it is strung upon a flat spring C, similar in shape to said holes. Thus the balls A cannot turn. These balls may not necessarily be round other than in cross-section as they lie on the spring, as see Fig. 4, where the ball is elliptical in one elevation. Moreover, they need not be exactly round in cross-section, as see Fig. 5, but they must be substantially round in cross-section, as above stated.

I am aware that a flat spring for sustaining the links of a bracelet is not new in the art to which this invention appertains, and hence I do not claim the same.

Having thus fully described my invention, what I claim, and desire to secure by Letters Patent, is—

In a bracelet of the class named, the combination of a flat spring for supporting the balls forming the links, and balls or shells, as A, substantially round in cross-section, provided with a row or line of ornamentation, as $a$, on their outer sides, and with rectangular holes B in their sides corresponding substantially with the shape of said spring, whereby they are strung on said spring and prevented from rotating thereon, substantially as set forth.

JAMES R. MATHEWSON.

Witnesses:
WINTHROP F. BARDEN,
FRANK E. WHITING.